Aug. 8, 1961 L. NAMENYI-KATZ 2,995,313

MAGNETIC RECORDING OR REPRODUCING DEVICES

Filed Nov. 18, 1957 2 Sheets-Sheet 1

Inventor
L. Namenyi-Katz
By Glascock Downing & Seebold
Attys.

Aug. 8, 1961 L. NAMENYI-KATZ 2,995,313

MAGNETIC RECORDING OR REPRODUCING DEVICES

Filed Nov. 18, 1957 2 Sheets-Sheet 2

Inventor
L. Namenyi-Katz
By: Glascock Downing & Seebold
Attys.

United States Patent Office 2,995,313

Patented Aug. 8, 1961

2,995,313

MAGNETIC RECORDING OR REPRODUCING DEVICES

Laszlo Namenyi-Katz, London, England, assignor to Epsylon Research and Development Company Limited Filed Nov. 18, 1957, Ser. No. 697,078
Claims priority, application Great Britain June 11, 1957
6 Claims. (Cl. 242—55.11)

This invention relates to magnetic recording or reproducing devices in particular to means for storing and playing magnetic tapes forming endless loops.

One object of the invention is to provide, in a magnetic tape recorder, a readily removable storage device upon which an endless band of tape may be stored, and means by which the tape may be brought into operative relationship with the tape transporting and recording elements without the necessity for cutting or splicing the tape, either when mounting or removing the storage device and the tape.

Another object is to provide a storage device for an endless band of tape in which the tape is unwound from the storage device for use in the recorder without being completely disengaged therefrom, is stored in the form of loose loops in a magazine in the recorder during use, and is then rewound on to the removable storage device for removal after use.

A further object is to provide a very convenient method of storing and using magnetic tape in the form of endless bands.

During the playing of the record the tape is substantially contained, in meander shape, in the magazine, while the aforementioned storage device is in a fixed position, the tape running around the eccentric boss or pulley. When it is desired to remove the tape from the magazine, the storage device is set rotating and the eccentric boss pulley running around the central boss, winds up the tape in the form of a double spiral. The storage device can now be removed from the recorder. When the magazine is to be replenished, the end of the loop is first fitted in the magazine and the tape is pulled off into the magazine, the storage device being thus rotated in opposite direction to that for winding up the tape until the magazine is replenished and the reproducing or recording can start.

The invention will be further described with reference to the accompanying drawings.

Figures 1, 2:
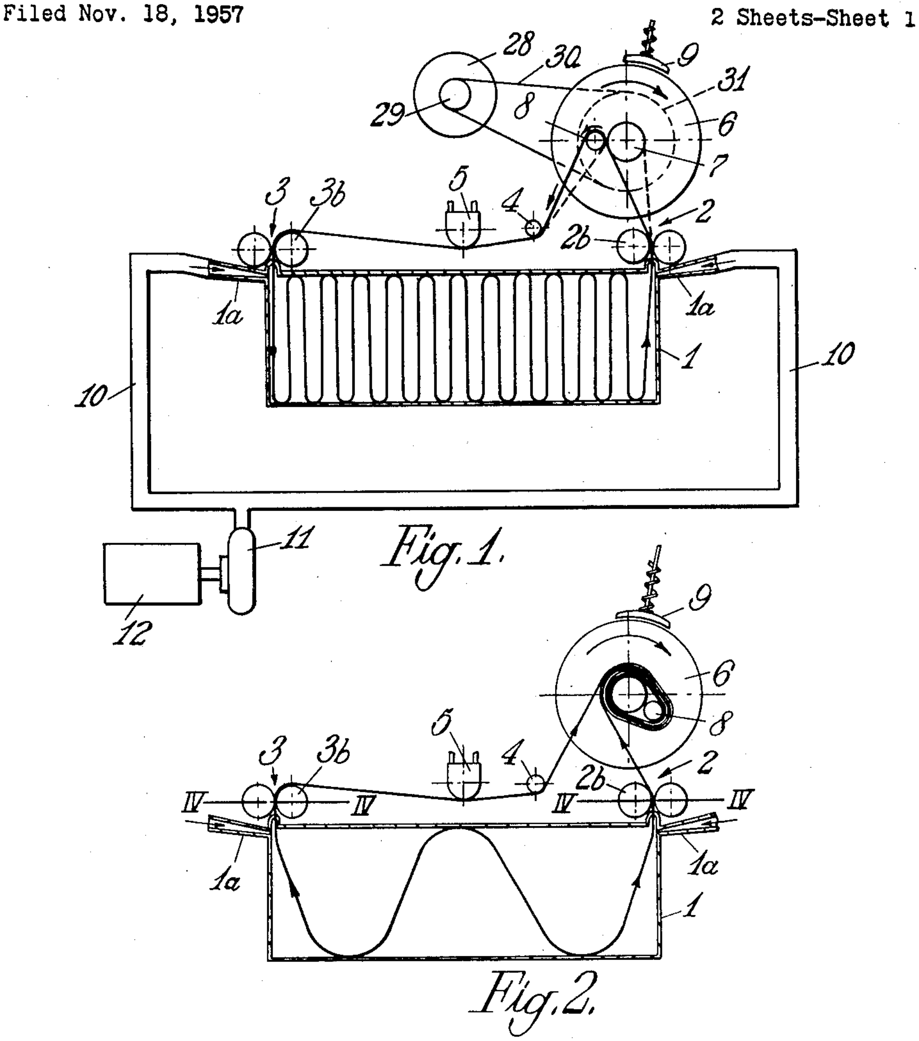
FIGURE 1 shows the device according to the invention set for reproducing or recording.
FIGURE 2 shows the same device during the winding up of the tape in an intermediate stage preliminary to removing the storage device.
Figure 3:
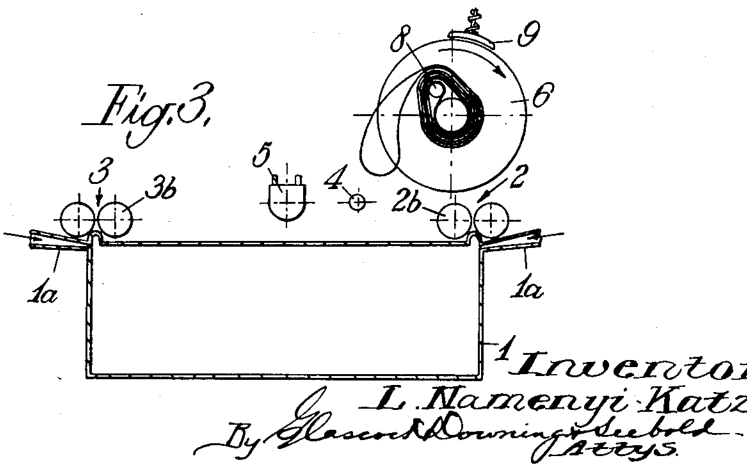
FIGURE 3 shows the storage device fully wound ready to be removed.

FIGURE 1 shows an assembly containing magazine 1 in which most of the length of an endless band of magnetic recording tape, indicated by a thick line, is contained in the form of meandering loops. The magazine has a lid and is provided with two openings, one at either end, through which the band may be fed or transported into or out of the magazine. It may also be provided with an air jet *1a* at one or both ends, the jet or jets being directed substantially along the line on which the band moves through the magazine. As shown in FIGURE 1 the jet or jets *1a* may be supplied through pipes 10 which are connected to an ordinary centrifugal blower 11 driven by a motor 12.

In FIGURE 1 the apparatus is shown in condition for recording or reproducing, when the band moves in the direction of the arrows. The tape is drawn from the magazine through one of the openings by a capstan and pinch roller assembly 2, which is of the well known kind. The capstan *2b* is driven and the pinch roller is carried on an arm *2a* (FIGURE 4) which is spring-pressed towards the capstan so that the tape is pinched between the two and is advanced by friction. From the capstan and pinch roller assembly 2 the tape moves to a roller 8 mounted on the baseplate 6 of a rotatable and removable storage device which, together with the magazine, replaces the two tape reels normally found on tape recorders and reproducers. The storage device is held against rotation by a brake 9, which acts upon the circumference of the baseplate 6.

From the roller 8 the tape moves round a jockey roller 4 and past a recording and reproducing head 5, which is of the conventional kind containing a magnetic circuit for influencing, or being influenced by, the magnetic condition of the portion of tape which is passing it and a winding by which electric signals may be impressed upon, or derived from, the magnetic circuit. The tape moves from the head 5 to an assembly 3 comprising a capstan *3b* and a pinch roller carried on an arm *3a*, which is exactly the same as that represented at 2, and thence into the magazine.

As is well known, it is important that the tape should be traversed past the recording/reproducing head at a constant speed and it is also highly desirable that the tape be kept taut. These requirements are met in the present apparatus by driving one capstan at a constant speed and driving the second capstan through a fluid coupling, a clutch or other slipping device running at a slightly different speed. For example, the capstan *2b* could be driven through the slipping device and in that case the slipping device would run at a speed slightly lower than that of the capstan *3b*. The capstan *3b* would then control the speed of tape traverse whilst the capstan *2b* would assist by drawing tape from the magazine and would also exert a drag on the tape passing to roller 8, thus keeping the whole length of tape outside the magazine taut. The tension applied to this length of tape is, of course, determined by the difference in speed and the characteristics of the slipping device. As an alternative, the capstan *2b* could be driven at a fixed speed and the capstan *3b* driven through a slipping device running at a slightly higher speed. The capstan *2b* would then control the tape speed and the capstan *3b* would exert a forward pull on the tape in endeavouring to drive it at a higher speed.

Figure 4:
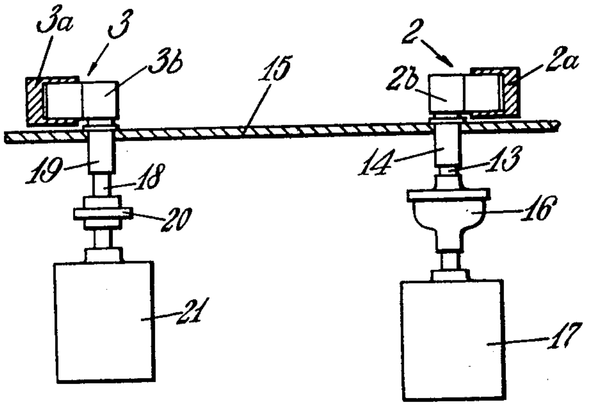
FIGURE 4 is a section through the two capstan/pinch roller assemblies on the line IV—IV showing the capstan drives and a portion of the base board.

FIGURE 4 illustrates the first arrangement described in the preceding paragraph. As shown in that figure the capstan *2b* is carried on a shaft 13 supported in a long bearing bush 14 carried on a base plate 15. The bush 14 is made long in order that the capstan 26 may be precisely located. Coupled to the end of the shaft 13 is a slipping device 16. It is preferred to use an oil-filled device consisting of paddle rotating in an internally ribbed casing filled with oil, which will slip when loaded, but other devices such as friction or eddy current clutches could be used instead. The slipping device 16 is coupled to the shaft of a motor 17. The capstan *3b* is mounted on a shaft 18 carried in a bush 19, similar to the bush 14, also mounted on the base plate 15. The shaft 18 is connected through the coupling 20 to a motor 21. The motor 21 is preferably of the synchronous type because in this arrangement the speed of the capstan *3b* must be closely controlled. On the other hand, the motor 17 is preferably of an induction or variable speed type. It will be understood that the arrangement shown in FIGURE 4 is only representative because tape speeds vary from 1⅞ inches per second or less in small portable recorders to 300 inches per second or more in large high speed machines used for instrumentation; therefore it may be convenient in some circumstances to provide gears or other speed-changing means and it may be necessary to provide for the capstans to be driven alternatively at different speeds to provide different speeds of tape traverse in the same recorder.

The base plate 6 carries a second cylindrical member 7, which may be a roller rotatable on a pin fixed to the baseplate, and if desired the tape may pass around the member 7 instead of the member 8, as is indicated by dotted lines in FIGURE 1.

The endless band of tape may be removed from the apparatus without cutting it by the following procedure. The capstans are stopped and the pinch rollers are withdrawn so that the tape may pass freely around both capstans. The conventional capstan assembly provides for the withdrawal of the pinch roller but, as an alternative, the direction of rotation of capstan 3b may be reversed, so that both capstans are drawing tape from the magazine or, as a further alternative, both capstans may be allowed to run freely. The brake 9 is disengaged and the storage device rotated in the direction of the arrow in FIGURE 2, so that the band is unwound, in a double spiral, round the members 7 and 8. When almost all of the band has been wound up as shown in FIGURE 2, the lid of the magazine is opened to release the last loop, the winding-up is completed and the storage device is removed with the tape. By reversing this process a new endless band may be mounted in the recorder without cutting and splicing. The base plate 6 may be rotated by any convenient means for winding up the tape, for example, a motor 28 having a pulley 29 around which a belt 30 is trained, the belt 30 also passing round a pulley 31 (shown dotted in FIGURE 1) mounted on the spindle on which the base plate 6 is carried. Here again the driving means is a matter of choice which will be influenced by the specific design of the recorder.

If, when feeding a new band into the magazine from both ends, the slipping device is driven at a speed slightly higher than that of the fixed capstan speed, and the brake 9 is partially applied, the fixed speed capstan will control the rate of tape feed and the other capstan will be compelled to feed tape at the same rate, so that the formation of a loose loop of tape is avoided.

Figure 5:
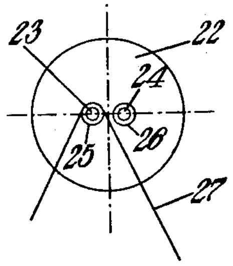
FIGURE 5 shows a modified form of the storage device.

Various modifications may be made within the scope of the invention. Thus, the boss 7 need not be on the axis of 6. Space utilization is best if both 7 and 8 are placed eccentrically at approximately equal distances. Storage reel 6 may then contain two rollers placed symmetrically around the axis of the spool instead of boss 7 and pulley 8, so that when the spool is rotated around its own axis the two rollers will wind tape in balance. Thus, in FIGURE 5 the baseplate 22 is provided with two pins 23 and 24 equally spaced from its axis, each pin carrying a rotatable roller, respectively 25 and 26. The initial loop 27 may be hooked on either rollers, if both are rotatable around their axis. The spool itself is carried on a conventional spooling device which is capable of rotating it in either direction at high speeds, and is also fitted with a brake 9.

If the rotatable baseplate 6 is loaded with tape in an endless loop form, the two centre rollers, which are used for the tape location on the carrier, prevent the tape from becoming creased and enable the endless loop to be fully wound up. The free loop end then may be threaded into the magazine as shown in FIGURE 2, and the two capstan and pinch roller assemblies 3 and 2 set in operation to feed the tape into the magazine, causing the tape to unwind from storage spool. When tape is fully loaded into the magazine, capstan roller 2b will open and switch off while capstan 3b is maintained in rotation and thereby through the guide rollers and the locating roller on the spool will pull the tape out of the magazine and feed it into the magazine continuously. When the tape has been played through, the tape must be removed from the magazine to prevent it becoming set in the form of a meandering band as the tape would become unusable for accurate performance having become set.

For this reason, therefore, spool carrier 6 is set in rotation in either direction causing the tape to be withdrawn from the magazine 1 and winding it on tightly around the two rollers replacing 7 and 8 until the tape is completely withdrawn except for the end of the closed loop which remains threaded into the apparatus. The spool then may be removed together with the free end of the closed loop and conveniently stored. For reloading, any spool containing tape in a closed loop form may be put on the spool carrier and the end of the closed loop threaded into the magazine which may then carry out the operation described above.

What I claim is:

1. Apparatus for recording upon and reproducing from magnetic tape in the form of an endless band comprising a magnetic recording and reproducing head, a magazine having two openings respectively at opposite ends thereof and adapted to accommodate most of said endless band in meandering loops, two reversible capstans respectively adjacent said two openings for feeding said band into and out of said magazine, driving means for each said capstan, a removable storage device for said band including a circular disc having a front face and mounted for rotation about its axis, said storage device also including two cylindrical members mounted on said front face, at least one of said members having its axis parallel to said disc axis, and brake means applicable to prevent rotation of said storage device, said endless band being fed from said magazine by one said capstan and fed around one of said cylindrical members past said head and back into said magazine by the other said capstan whilst said brake means are applied for recording and reproducing, said endless band being wound in a double spiral around both said cylindrical members with said brake means free and released from said magazine for removal and storage with said baseplate without cutting said endless band.

2. Apparatus as claimed in claim 1 wherein said two cylindrical members are mounted equidistantly spaced from the axis of said disc at diametrically opposite points and at least one of said cylindrical members comprises a pin mounted on said front face of said disc and a cylindrical roller rotationally mounted on said pin.

3. Apparatus as claimed in claim 1 wherein one of said cylindrical members comprises a pin mounted on said front face of said disc and a cylindrical roller rotationally mounted on said pin, said band being fed round said cylindrical roller.

4. Apparatus as claimed in claim 3 wherein the other of said cylindrical members is mounted coaxially with said disc.

5. Apparatus for recording upon and reproducing from magnetic tape in the form of an endless band comprising a magnetic recording and reproducing head, a magazine to accommodate most of said endless band arranged therewithin in meandering loops, said magazine having two openings for the passage of said band respectively at opposite ends thereof, two capstans for transporting said band, one adjacent each said opening, means to drive each said capstan, one said capstan turning at a fixed speed, a slipping device coupled between the other said capstan and said driving means, said slipping device being driven at a speed slightly different from the speed of said one capstan, a removable storage device for said band including a circular baseplate rotatable about its axis, two cylindrical members mounted on said baseplate with their axes parallel with said axis, one of said cylindrical members being rotatable about its axis, and brake means operative to prevent rotation of said storage device, arranged so that for recording and reproducing said band is transported from said magazine through one said opening by one said capstan, and transported round said rotatable cylindrical member past said head and back to said magazine through the other said opening by the other said capstan with said brake means operative, the one said capstan running at said fixed speed determining the speed of tape transport and the other said capstan serving through said slipping device to maintain a desired tension on said tape during its passage around said cylindrical member and past said head, said band being removable from said apparatus without cutting by rotating said base plate with said brake means inoperative to wind said band in a doubled loop around said two cylindrical members, releasing said band from said magazine, and removing said storage device.

6. Apparatus as claimed in claim 5 comprising an air jet in at least one end wall of said magazine and means to supply air under pressure to said jet, said jet being so directed as to compress the meandering loops in said magazine against each other to enable the maximum number of loops to be accommodated.

References Cited in the file of this patent

UNITED STATES PATENTS

| | | |
|---|---|---|
| 1,001,208 | Mercer | Aug. 22, 1911 |
| 1,883,987 | Lasowsky | Oct. 25, 1932 |
| 2,808,259 | Wengel | Oct. 1, 1957 |